Feb. 11, 1930.  L. LEVY  1,746,898
MECHANICAL MOTION CONVERTER
Filed May 3, 1926
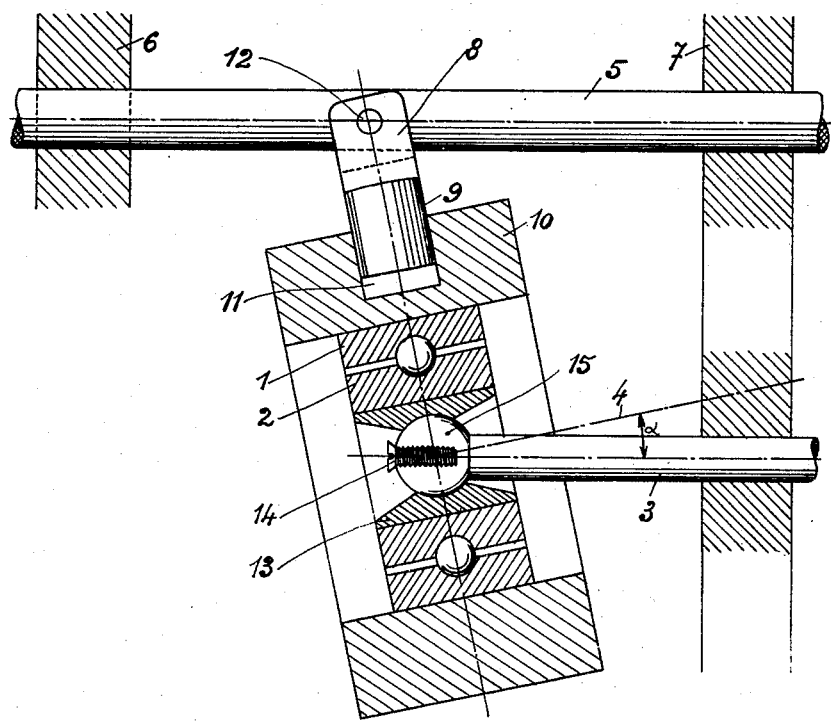
Inventor.
Lucien Levy
By Henry Orth Jr.
Atty.

Patented Feb. 11, 1930

1,746,898

UNITED STATES PATENT OFFICE

LUCIEN LEVY, OF PARIS, FRANCE

MECHANICAL MOTION CONVERTER

Application filed May 3, 1926, Serial No. 106,512, and in France May 8, 1925.

My invention relates to a new device which allows of transforming a continuous rotary motion into an alternate oscillatory motion or inversely, said motion taking place in a plane passing through the axis of rotation and about an axis perpendicular to said plane.

Up to this day motions of that kind were generally produced by means of cams which besides being expensive in construction require on the other part the use of a complete set of such cams in order to obtain a more or less considerable range of motion.

Now the present device allows of varying and controlling the range of the oscillatory motion and the number of oscillations for a predetermined rate of speed of the rotary axis in order to bring it to any predetermined value. It has the advantage of completely avoiding the mechanical play which owing to friction takes place in a very short time in cam devices by substituting a rolling motion for the sliding motion. The reciprocating motion is continuously repeated with the greatest accuracy, it is remarkable in that it is sinusoidal this being advantageous in a great number of applications, for instance in wire winding and in the making of coils for the electric current.

The annexed drawing shows a motion converting device according to my invention.

As will be seen the motion converter comprises essentially a ball bearing in which the outer cage 1 is prevented from turning whilst the other, 2, is secured upon the axis 3 which effects the rotary movement which is to be converted. The ball bearing is fixed upon the axis of rotation in such a manner that the axis of symmetry 4 of the ball bearing does not correspond with the axis of rotation and forms with the latter an angle $\alpha$. In these conditions the axis of symmetry of the ball bearing describes a conical surface having an angle $2\alpha$ about the axis of rotation and the ball surface 2 turns as it oscillates whilst the surface 1 oscillates. This oscillatory motion is transmitted to an axis 5 sliding in bearings 6 and 7 by means of a part 10 which is keyed upon the surface 1 of the ball bearing and is provided with a cylindrical recess 11 in which moves a piston 9 provided with a fork 8 oscillating about an axis 12.

The axis 3 is connected with the surface 2 for instance by means of a part 13 which is locked upon the ball bearing and having on the exterior a cylindrical shape and inside a spherical shape. The axis 3 is also provided at 15 with a split part in the shape of a ball the diameter of which is adjustable by means of a screw 14 designed to open out the split elements and consequently to allow the locking of the ball bearing upon the axis 3 whatever the angle $\alpha$ may be. By these means and by simply adjusting the angle $\alpha$ the range of the oscillatory movement of the axis 5 may be adjusted in a relatively large measure when the axis 3 rotates.

What I claim and desire to secure by Letters Patent of the United States is:

1. A mechanical movement, comprising a rotary driving shaft, a reciprocable driven shaft substantially parallel thereto, an inner raceway member connected to the driving shaft, an outer raceway member having a recess in its periphery, antifriction elements between the members, and a piston slidable in said recess and hinged to the driven shaft.

2. A mechanical movement, comprising a rotary driving shaft, a split ball on said shaft, means to force the parts of the ball apart, a part having an internal seat for said ball against which the ball is frictionally held, and an external cylindrical surface, an inner raceway member secured on said part, an outer raceway member therefor, antifriction elements between the members and means between the outer member and driven shaft to reciprocate the same, said members being inclined to the axis of the driving shaft.

In testimony that I claim the foregoing as my invention, I have signed my name.

LUCIEN LEVY.